June 28, 1938. J. SOSS ET AL 2,122,301
LONG THROW CONCEALED HINGE
Filed July 18, 1936
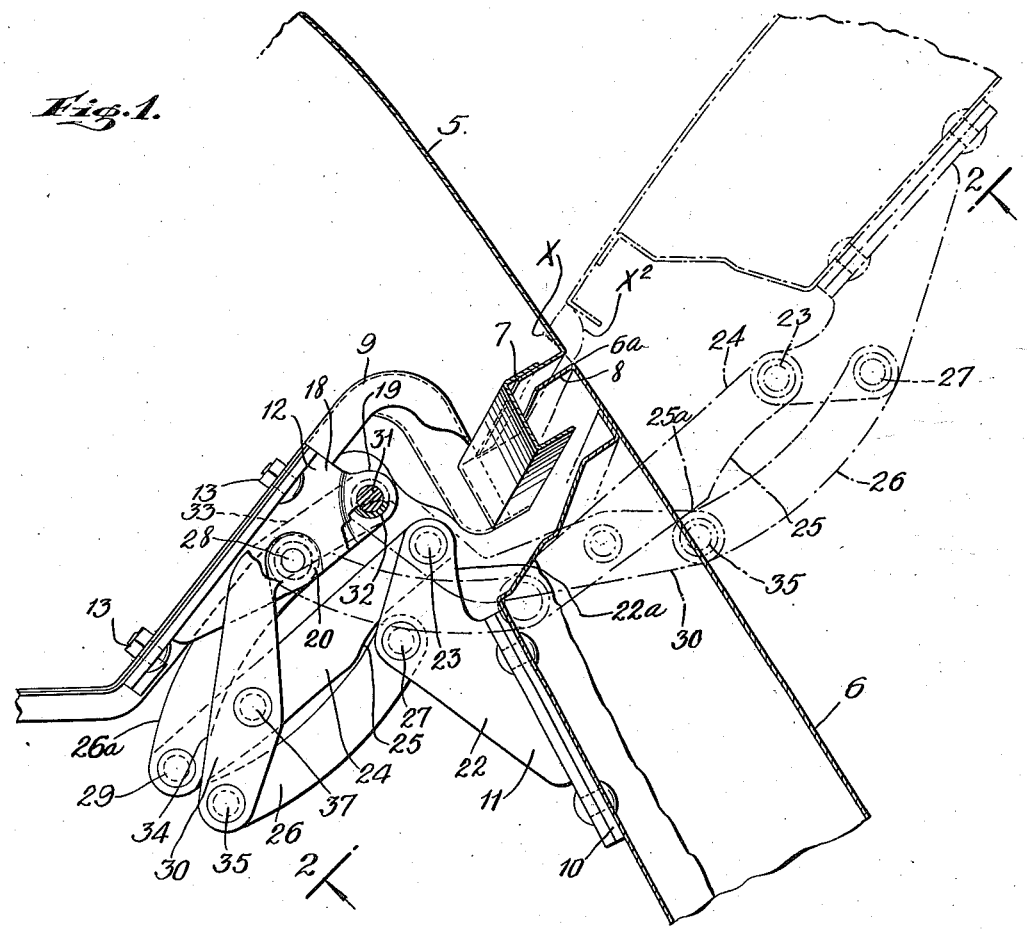
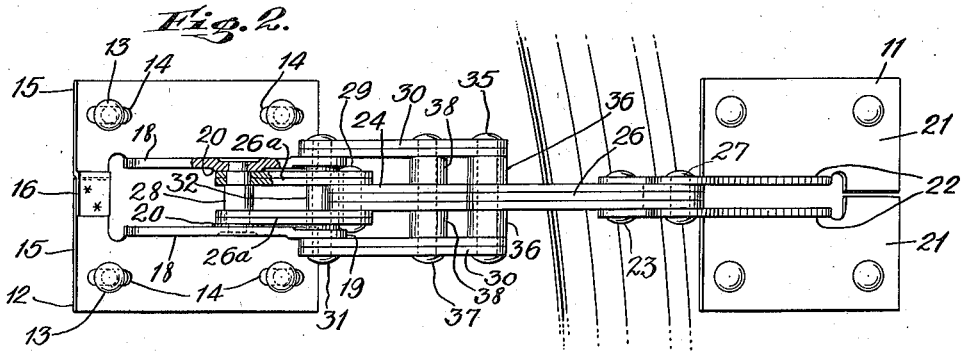
INVENTORS
JOSEPH SOSS
FRANCIS H. SCHWARTZ
BY
ATTORNEY Patented June 28, 1938

2,122,301

UNITED STATES PATENT OFFICE 2,122,301

LONG THROW CONCEALED HINGE

Joseph Soss and Francis H. Schwartz, Roselle, N. J.; said Schwartz assignor to said Soss Application July 18, 1936, Serial No. 91,374

10 Claims. (Cl. 16—163)

This invention relates to a concealed hinge and particularly to a hinge of this type adapted for use in supporting the doors or closure members of rear compartments, luggage compartments or the like of a motor vehicle to permit the proper throw or swinging movement of such closures, and the object of the invention is to provide a hinge of the class described the butts of which, when collapsed, are arranged in an angular position with respect to each other and employ a plurality of long link plates or arms for hingedly coupling the butts together in such manner as to provide a long throw or movement of one butt with respect to the opposed butt; a further object being to provide a hinge of the class described, wherein the butt secured to and carried by the door or closure member swings through a fixed arc from a common axis so as to provide a smooth non-jerking, non-catching or binding movement of the door or closure member in the operation of opening and closing the same; a further object being to provide a hinge of the class described wherein the links are composed of sheet metal parts and further wherein said parts may consist of laminated plates or links to simplify and economize the construction of the hinge; a further object being to provide a hinge of the class described the butts of which are composed of pairs of sheet metal parts, one of said butts having elongated bolt apertures to provide adjustable mounting of the butt in connection with its support; a still further object being to provide a linkage for hinges of the class described, wherein the links are so fashioned and mounted as to nest in close proximity to each other when the hinge is in closed position and to be otherwise compact in arrangement; and with these and other objects in view the invention consists in a hinge of the class and for the purpose specified, which is simple in construction, efficient in use and which is constructed as hereinafter described and claimed.

The invention is fully disclosed in the following specification, of which the accompanying drawing forms a part, in which the separate parts of our improvement are designated by suitable reference characters in each of the views, and in which:—

Fig. 1 is a sectional view through part of the body of a motor vehicle, diagrammatically illustrating the mounting of the hinge in connection therewith.

Fig. 2 is a view substantially looking in the direction of the arrows 2—2 of Fig. 1, with part of the construction broken away and in section; and, Fig. 3 is a view similar to Fig. 2, showing only a part of the construction and showing a modification.

In Fig. 1 of the drawing, we have indicated at 5 the vertical section of the rear end portion of a motor vehicle or a luggage compartment of such vehicle, and at 6 have indicated a corresponding section or part of the door or closure member for controlling admission to such compartment or storage space of the vehicle.

The body portion 5 is provided at the boundary edges of the opening formed therein to receive the door or member 6 with the usual drip channel 7, the channel of which is directed upwardly or outwardly and the corresponding edge portion of the member 6 is provided with an inwardly extending flange 8, which is adapted to enter the channel to guide rain water and the like into said channel 7. It will be understood in this connection that the diagrammatic drawing of Fig. 1 is merely illustrative of one use of the hinge and the same may be applied to other types and kinds of stationary supports and swinging members.

In Fig. 1, 9 represents a bracket or hanger which constitutes part of the body 5, whereas at 10 is shown a mounting plate to which the butt part 11 of the hinge is secured in mounting the same in connection with the member 6. The butt part 12 is secured to the bracket or hanger 9 by bolts or other fasteners 13 which pass through elongated apertures 14 in the attaching plate 15 of the butt 12 to adjustably support the butt 12 upon the support 9 as will appear from a consideration of Figs. 1 and 2 of the drawing.

It will be understood that in hingedly mounting and hanging the member 6, two of the hinge units will be employed, one at each side or upper corner portion of the member 6 and as the structure of each hinge unit will be the same only one unit is shown and described.

The butt 12 is formed from two substantially similar sheet metal parts, in the construction shown, the attaching plate 15 having overlapping portions as at 16 which are welded or otherwise secured together, and the inner adjacent edges of the attaching plate are provided with inwardly extended bearing plates 18 substantially of the contour represented in Fig. 1 of the drawing, the wide and projecting end portions 19 of each of said plates being offset outwardly, whereas the central portion of said bearing plates are offset inwardly as seen at 20. The purpose of these offsets being to space the links, later described, from the inner and outer surfaces of the bearing plates to reduce friction as will be apparent.

The butt 11 is also composed of two similar sheet metal parts having attaching plates 21 and bearing plates 22, the latter being of the contour clearly seen in Fig. 1 of the drawing, and it will also be noted that the bearing plates 22 are arranged in closer relation to each other than the bearing plates 18 of the butt 12, as clearly illustrated in Fig. 2 of the drawing.

The bearing plates 22 project beyond one side edge of the attaching plates 21 in the form of projecting hook arms 22a to provide the proper support for the pintle or pintle pin of the links of the hinge.

Pivotally supported on the pin 23 mounted in hook arms 22a of the bearing plates 22 is one link 24 of the hinge, which consists of a substantially straight link, one side edge of which is cut out or recessed, as seen at 25, to clear the link 26 pivoted to the bearing plates 22 on a pin or pintle 27, the link 26 being curved as illustrated in Fig. 1 of the drawing. A pair of corresponding links 26a are pivoted to the bearing plates 18 on pins 28, and the links 26a are disposed upon the upper and lower surfaces of the link 24 and pivoted to the end of said link on the pivot 29. The central portion of the pin 28 is enlarged to act as a bushing to space links 26a a distance equal to the thickness of the link 24, as clearly seen in Fig. 2 of the drawing. In this figure it will also be noted that the outer surfaces of the links 26a bear upon the inwardly offset portions 20, and the reduced ends of the pin 28 terminate in the recess formed in the outer surfaces of the bearing plates 18 in forming the offset bearing surfaces 20. It will also be apparent that the links 24 and 26 are of the same thickness to fit within and between the adjacent surfaces of the bearing plates 22.

Another pair of links 30 are pivoted at one end to the offset bearing portions 19 by pins 31, the links 30 being arranged on the outer surfaces of the bearing portions 19, as clearly seen in Fig. 2 of the drawing, and a bushing 32 is arranged between the adjacent surfaces of the offset bearing portions 19. The links 30 are of the irregular contour shown in Fig. 1 of the drawing, the end portions 33 thereof attached to the pins 31 being arranged longitudinally of the butt 12 when the hinge is in collapsed position, whereas the end portions 34 thereof extend outwardly at an angle to the end portions 33 in what might be termed an open L-formation. The free ends of the end portions 34 are pivoted to the free end of the link 26 at 35, bushings 36 being disposed between the inner surfaces of the links 30 and the outer surfaces of the link 26. Inwardly of the pivot 35 is another pivot 37 which also passes through the link 24 inwardly of and adjacent the pivot 29, and bushings 38 are arranged between the inner surfaces of the links 30 and the outer surfaces of the link 24.

While the links or pairs of links may be of unitary construction, said links in the construction shown are composed of thin sheet metal stampings or laminae for the purpose of simplifying and economizing the cost of production as well as to produce greater strength in the resulting hinge.

In the construction shown in Figs. 1 and 2 of the drawing, the links 24 and 26 are composed of three plates or laminae, whereas the pairs of links 26a and 30 are composed of two plates or laminae. The economy in constructing a hinge of this type will be further apparent from the standpoint that by constructing the links 26 and 26a, which are all of the same contour and dimensions, from a plate or lamina of one form, these may be readily used and assembled to form the required thickness of the respective links 26 and 26a. In this connection, it will also be apparent that only three different blanks are necessary to form the complete link unit and substantially one forming die is necessary to make each of the parts of the respective butts.

In Fig. 3 of the drawing, we have shown and described a modification which consists simply in arranging a pair of links 26b similar to the link 26 and directly above the link 26 with the inner surfaces of the pairs of links 26b arranged upon the outer surfaces of the bearing plates 22 and upon narrow washers or bushings 36a which are substituted for the side bushings 36, and this will dispose the outer surfaces of the pairs of links 26b upon the inner surfaces of the pairs of links 30 adjacent the pintle 35. In like manner, pairs of short links 24a may be arranged upon the link 24 and extend only between the pivots 23 and 37 and arranged in alinement with the links 26b, in other words, upon the outer surfaces of the bearing plates 22 and upon the inner surfaces of the links 30 and being spaced from the outer surfaces of the link 24 by thin washers or bushings 38a which are substituted for the wider bushings 38.

One of the distinctive features of the hinge resides in the provision of a linkage between the respective butts of the hinge to provide a free swinging movement of the door or member 6 in respect to a predetermined axis which in the accompanying drawing is designated at $x$ in Fig. 1, so that a given point on the member 6, for example the corner 6a, will swing through a true arc which is represented by the dot and dash line $x2$, the axis of which is the point $x$. In other words, the pivots 23, 27 move in a similar manner with respect to the axis $x$ only on arcs of different radii. With this construction, all binding stresses and strains are removed or eliminated which will in turn eliminate undue stresses and strains upon the pivots or wearing parts of the hinge.

While suitable means may be provided for checking or limiting the outwardly swinging movement of the hinge or the member 6, attention is directed to the fact that this movement may be checked by the engagement of the end portion of the link 26 at the pivot 35 with the outer surface of the link 24 adjacent the reduced portion 25 therein, as clearly indicated at the point 25a in dotted lines in Fig. 1 of the drawing. The further movement of the hinge is naturally checked by the door or closure 6 engaging the frame of the body part. However, when the hinge is detached from its support the closing movement of the hinge will be checked by the engagement of the rounded portion of the link 30 with the inner surfaces of the attaching plate 15.

It will be understood that the illustrations in the accompanying drawing is illustrative of one use of the invention or method of carrying the same into effect, and that the hinge will be applicable to any other kinds and classes of stationary supports and swinging members, and it will also be understood in this connection that other arrangements of the butt part and the contour as well as the size of the links may be modified to suit the different installations and uses of the hinge.

Having fully described our invention, what we claim as new and desire to secure by Letters Patent, is:—

1. In a hinge of the class described, two hinge butts and a multiple link unit for hingedly coupling said butts to permit relative movement thereof, each of said butts being formed from a pair of substantially similar sheet metal parts, each part having an attaching plate portion and a bearing portion extending angularly from one surface thereof, the bearing portion of one part being arranged in spaced relation to and parallel with the bearing portion of the companion butt part, said bearing portions being apertured to receive pivot pins for pivotally mounting the link unit in connection therewith, the bearing portions of one butt having inwardly offset parts adjacent one of the pintle apertures, and the bearing portions of said butt having outwardly offset parts adjacent another pintle aperture therein.

2. In a hinge of the class described, two hinge butts and a multiple link unit for hingedly coupling said butts to permit relative movement thereof, each of said butts being formed from a pair of substantially similar sheet metal parts, each part having an attaching plate portion and a bearing portion extending angularly from one surface thereof, the bearing portion of one part being arranged in spaced relation to and parallel with the bearing portion of the companion butt part, said bearing portions being apertured to receive pivot pins for pivotally mounting the link unit in connection therewith, the bearing portions of one butt having inwardly offset parts adjacent one of the pintle apertures, the bearing portions of said butt having outwardly offset parts adjacent another pintle aperture therein, the separate parts of said last mentioned butt having overlapping portions, and means for securing said overlapping portions together.

3. In a hinge of the class described, two hinge butts and a multiple link unit for hingedly coupling said butts to permit relative movement thereof, each of said butts being formed from a pair of substantially similar sheet metal parts, each part having an attaching plate portion and a bearing portion extending angularly from one surface thereof, the bearing portion of one part being arranged in spaced relation to and parallel with the bearing portion of the companion butt part, said bearing portions being apertured to receive pivot pins for pivotally mounting the link unit in connection therewith, and the bearing portions of one butt being spaced apart a greater distance than the spacing of the bearing portions of the opposed butt.

4. In a hinge of the class described, two hinge butts and a multiple link unit for hingedly coupling said butts to permit relative movement thereof, each of said butts being formed from a pair of substantially similar sheet metal parts, each part having an attaching plate portion and a bearing portion extending angularly from one surface thereof, the bearing portion of one part being arranged in spaced relation to and parallel with the bearing portion of the companion butt part, said bearing portions being apertured to receive pivot pins for pivotally mounting the link unit in connection therewith, the bearing portions of one butt being spaced apart a greater distance than the spacing of the bearing portions of the opposed butt, and the bearing portions of the last mentioned butt having projecting parts extending beyond one side edge of the attaching plate portions of said butt.

5. A concealed hinge of the class described comprising butt members having attaching plate portions and spaced bearing plates projecting from one surface of the attaching plate portions, the attaching plate portions of said butt members being disposed in angular relation with respect to each other when the hinge is in closed position, means involving a plurality of links having fixed pivotal couplings on the bearing plates of the respective butt members and fixedly pivoted to each other for providing a wide throw and swinging movement of one of said butt members with respect to the other butt member in moving the hinge from a closed position to an open position, the links pivoted to one of the butt members being arranged in pairs, the links pivoted to the other of said butt members being arranged between the pairs of the first named links, one pair of the first named links being disposed outwardly of the bearing plates of the first mentioned butt and the pivotal mounting of the links in connection with each other and with said butt members providing swinging movement of the movable butt member through a true radius arc having an axis point arranged in spaced relation to both of said butts.

6. A concealed hinge comprising butt members, each of said butt members having an attaching plate portion and an angularly extending link supporting part, the link supporting part of each butt projecting at one end of the attaching plate portion, and the attaching plate portions of each butt being arranged angularly to each other when the hinge is in closed position, a link unit for hingedly coupling said butt members, said unit comprising two long link arms and two shorter link arms, one of the long link arms being substantially L-shaped in form and the other straight, and the short link arms being similar in form and curved, one end of one long link arm and one short link arm being fixedly pivoted to one butt member and the other long and short arms being fixedly pivoted at one end to the other butt member, the long arms being pivoted together adjacent their free ends, and the free ends of one long arm being pivoted to the free end of the short arm pivoted to an opposed butt member to provide a wide throw and swinging movement of one butt member with respect to the other butt member.

7. A concealed hinge comprising butt members, each of said butt members having an attaching plate portion and an angularly extending link supporting part, the link supporting part of each butt projecting at one end of the attaching plate portion and the attaching plate portions of each butt being arranged angularly to each other when the hinge is in closed position, a link unit for hingedly coupling said butt members, said unit comprising two long link arms and two shorter link arms, one of the long link arms being substantially L-shaped in form and the other straight, and the short link arms being similar in form and curved, one end of one long link arm and one short link arm being fixedly pivoted to one butt member, and the other long and short arms being fixedly pivoted at one end to the other butt member, the long arms being pivoted together adjacent their free ends, the free ends of one long arm being pivoted to the free end of the short arm pivoted to an opposed butt member to provide a wide throw and swinging movement of one butt member with respect to the other butt member, and the long arm and short arm pivoted to one of said butt members consisting of pairs of arm parts arranged outwardly of the side faces of the other long and short arm to which they are pivoted.

8. In a long throw concealed hinge of the class described, two butt members having attaching plate portions and spaced bearing plates, a link unit for hingedly coupling said butt members, said unit comprising two arms pivoted to the bearing plates of one butt, two arms pivoted to the bearing plates of the other butt and to the free ends of the first named arms, one arm of each butt being pivoted together adjacent the last named pivot between said arms, the arms pivoted to one of said butts being arranged in pairs, one pair being disposed on the inner surfaces of the bearing plates of said butt, the other pair being arranged on the outer surfaces of said bearing plates, and the arms pivoted to the other of said butts being disposed between said pairs of arms.

9. In a long throw concealed hinge of the class described, two butt members having attaching plate portions and spaced bearing plates, a link unit for hingedly coupling said butt members, said unit comprising two arms pivoted to the bearing plates of one butt, two arms pivoted to the bearing plates of the other butt and to the free ends of the first named arms, one arm of each butt being pivoted together adjacent the last named pivot between said arms, the arms pivoted to one of said butts being arranged in pairs, one pair being disposed on the inner surfaces of the bearing plates of said butt, the other pair being arranged on the outer surfaces of said bearing plates, the arms pivoted to the other of said butts being disposed between said pairs of arms, and one of the arms pivoted to the second named butt being arranged in pairs.

10. In a long throw concealed hinge of the class described, two butt members having attaching plate portions and spaced bearing plates, a link unit for hingedly coupling said butt members, said unit comprising two arms pivoted to the bearing plates of one butt, two arms pivoted to the bearing plates of the other butt and to the free ends of the first named arms, one arm of each butt being pivoted together adjacent the last named pivot between said arms, the arms pivoted to one of said butts being arranged in pairs, one pair being disposed on the inner surfaces of the bearing plates of said butt, the other pair being arranged on the outer surfaces of said bearing plates, the arms pivoted to the other of said butts being disposed between said pairs of arms, means for disposing adjacent surfaces of the pairs of arms in spaced relation to each other, and with one of the pairs of arms in spaced relation to the arms of the second named butt.

JOSEPH SOSS.
FRANCIS H. SCHWARTZ.